(12) United States Patent
Pace et al.

(10) Patent No.: US 8,355,627 B2
(45) Date of Patent: Jan. 15, 2013

(54) 3D CAMERA WITH FOREGROUND OBJECT DISTANCE SENSING

(75) Inventors: Vincent Pace, Shadow Hills, CA (US); Patrick Campbell, Stevenson Ranch, CA (US)

(73) Assignee: James Cameron & Vincent Pace, Burbank, CA (US)

( * ) Notice: Subject to any disclaimer, the term of this patent is extended or adjusted under 35 U.S.C. 154(b) by 0 days.

(21) Appl. No.: 13/371,273

(22) Filed: Feb. 10, 2012

(65) Prior Publication Data

US 2012/0141102 A1    Jun. 7, 2012

Related U.S. Application Data

(63) Continuation of application No. 12/752,095, filed on Mar. 31, 2010, now Pat. No. 8,139,935.

(51) Int. Cl.
 *G03B 35/00* (2006.01)
(52) U.S. Cl. ...................................... 396/324
(58) Field of Classification Search .................. 396/322, 396/324–326, 329, 333; 348/42, 47, 48
See application file for complete search history.

(56) References Cited

U.S. PATENT DOCUMENTS

| | | | |
|---|---|---|---|
| 3,990,087 A | 11/1976 | Marks | |
| 4,557,570 A | 12/1985 | Hines | |
| 4,650,305 A | 3/1987 | Hines | |
| 4,725,863 A | 2/1988 | Dumbreck et al. | |
| 4,751,570 A | 6/1988 | Robinson | |
| 4,881,122 A | 11/1989 | Murakami | |
| 4,999,713 A | 3/1991 | Ueno et al. | |
| 5,175,616 A | 12/1992 | Milgram | |
| 5,532,777 A | 7/1996 | Zanen | |
| 5,727,239 A | 3/1998 | Hankawa | |
| 5,740,337 A | 4/1998 | Okino et al. | |
| 5,864,360 A * | 1/1999 | Okauchi et al. | 348/47 |
| 6,292,634 B1 | 9/2001 | Inaba | |
| 6,388,666 B1 | 5/2002 | Murray | |
| 6,414,709 B1 | 7/2002 | Palm et al. | |

(Continued)

FOREIGN PATENT DOCUMENTS

JP    2008171195 A  *  7/2008

OTHER PUBLICATIONS

JP-2008-171195 A Machine translation available from JPO website.*

(Continued)

*Primary Examiner* — Clayton E Laballe
*Assistant Examiner* — Minh Phan
(74) *Attorney, Agent, or Firm* — SoCal IP Law Group LLP; Steven C. Sereboff; John E. Gunther

(57) ABSTRACT

A stereographic camera system and a method of operating a stereographic camera system. The stereoscopic camera system may include a left camera and a right camera having respective left and right lenses, a zoom mechanism to set a focal length of the left and right lenses, a focus mechanism to set a focus distance of the left and right lenses, and an IOD mechanism to set an interocular distance between the left and right cameras. A foreground distance sensor may sense, in near-real time, a distance to a closest foreground object. A controller may cause the IOD mechanism to set the interocular distance based on, in part, the focal length, the focus distance, and the distance to the closest foreground object.

12 Claims, 8 Drawing Sheets

U.S. PATENT DOCUMENTS

| | | |
|---|---|---|
| 6,466,746 B2 | 10/2002 | Inaba |
| 6,512,892 B1 | 1/2003 | Montgomery et al. |
| 6,701,081 B1 | 3/2004 | Dwyer et al. |
| 6,798,406 B1 | 9/2004 | Jones et al. |
| 7,190,389 B1 | 3/2007 | Abe et al. |
| 7,899,321 B2 | 3/2011 | Cameron et al. |
| 2006/0204240 A1 | 9/2006 | Cameron et al. |
| 2010/0026809 A1 | 2/2010 | Curry |
| 2010/0239240 A1* | 9/2010 | Cameron et al. ............ 396/325 |

OTHER PUBLICATIONS

21st Century3d.com, "21st Century 3D Introduces Uncompressed 4:4:4 Stereoscopic Camera System—3DVX3", SPIE Stereoscopic Displays and Applications Conference; published Jan. 18, 2006, avail. Http://www.21stcentury3d.com/press/pr-060117-3dvx3.html; accessed on Sep. 11, 2008, pp. 1-3.

FullCamera.com, "21st Century 3D Introduces New Digital Steroscopic Motion Picture Camera System", Publishes Apr. 14, 2008, available at; http://fullcamera.com/article/cfm/id/281457, accessed on Sep. 11, 2008, pp. 1-2.

Hurwitz, Matt, "Dreaming in 3D", CineGear Expo News, The Official CineGear Expo Show Newspaper, Jun. 3-5, 2005, pp. 18-19.

Dhond et al., Stereo Matching in the Presence of Narrow Occluding Objects Using Dynamic Disparity Search, IEEE transactions on Pattern Analysis and Machine Intelligence vol. 17, No. 7, Jul. 1995, journal, pp. 719-724.

World Intellectual Property Organization, International Search Report and Written Opinion for International Application No. PCT/US2011/030812, mail date May 25, 2011.

* cited by examiner

3D CAMERA WITH FOREGROUND OBJECT DISTANCE SENSING

RELATED APPLICATION INFORMATION

This patent is a continuation of application Ser. No. 12/752,095, filed Mar. 31, 2010, entitled 3D CAMERA WITH FOREGROUND OBJECT DISTANCE SENSING.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to camera systems and specifically to camera systems including a stereographic camera.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
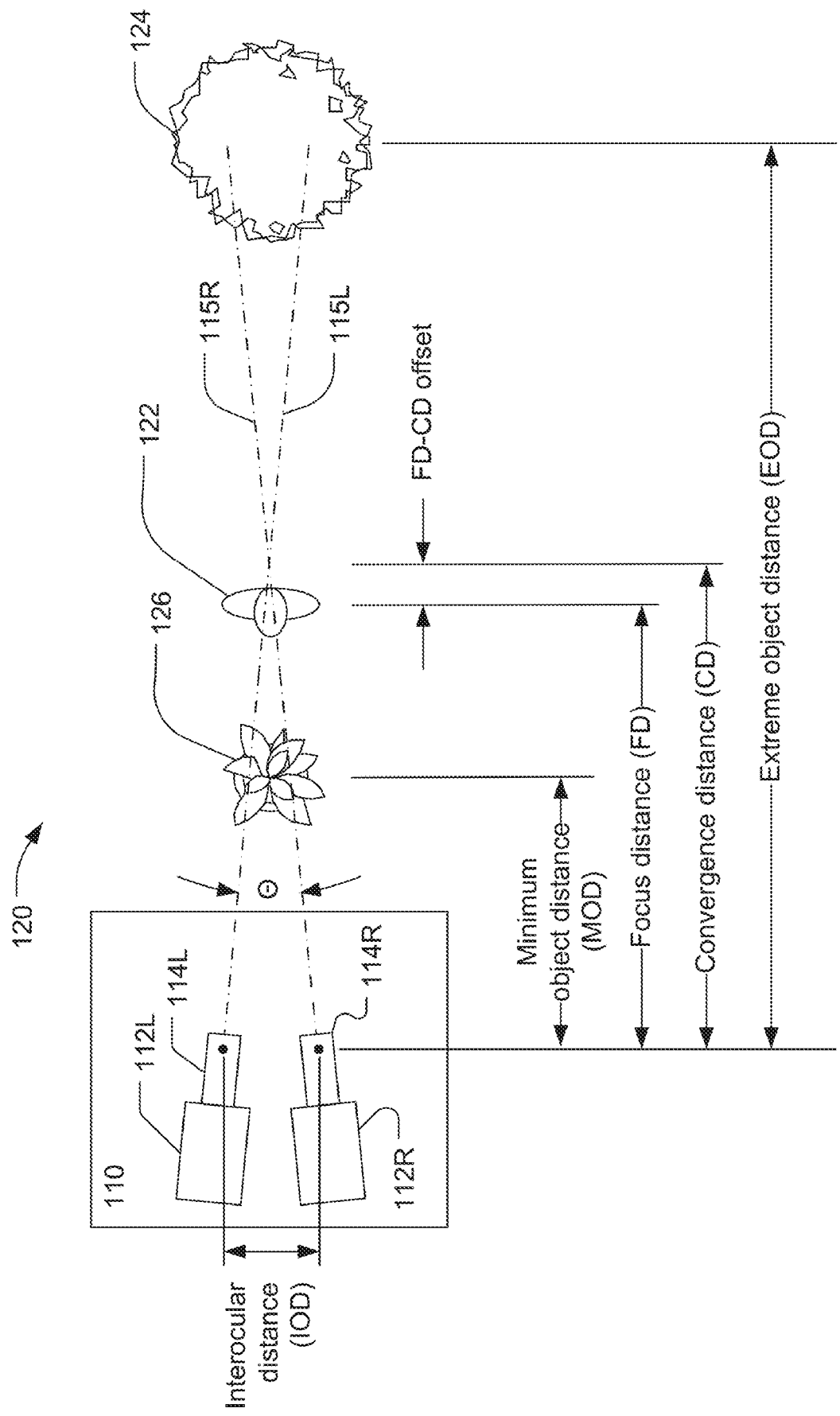
FIG. 1 is a schematic view of a stereographic camera in an environment.

Referring now to FIG. 1, a stereographic camera 110 may include a left camera 112L and a right camera 112R. The term "camera" is intended to include any device having an optical system to form an image of an object and a medium to receive and detect and/or record the image. The left and right cameras 112L, 112R may be film or digital still image cameras, may be film or digital motion picture cameras, or may be video cameras. Each of the left and right cameras 112L, 112R may include a lens 114L, 114R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 112L, 112R.

The left and right cameras 112L, 112R may be separated by an interocular distance IOD. The cameras 112L, 112R may be disposed such that the axis 115L, 115R are parallel or such that a stereo convergence angle Θ is formed between the two axis 115L, 115R. The cameras 112L, 112R may be disposed such that the axis 115L, 115R cross at a stereo convergence distance CD from the cameras. The interocular distance IOD, the stereo convergence distance CD, and the stereo convergence angle Θ are related by the formula $$\Theta = 2A\ TAN(IOD/2CD), \text{ or} \quad (1)$$

$$CD = IOD/[2\ TAN(\Theta/2)]. \quad (2)$$

The interocular distance IOD and the stereo convergence distance CD may be measured from a nodal point within the lenses 114L, 114R. The nodal points may be, for example, the centers of the entrance pupils of the respective lens 114L, 114R.

The stereographic camera 110 may be used to form a stereographic image of a scene 120 composed of a plurality of scene elements or objects at different distances from the stereographic camera. As shown in the simplified example of FIG. 1, the scene 120 may include a primary object 122, which is shown, for example, as a person. The scene 120 may include other objects in the background (behind the primary subject 122), such as the tree 124. The scene 120 may also include other objects in the foreground (between the camera and the primary subject 122), such as the plant 126. A distance from the stereographic camera 110 to the furthest background object may be defined as the extreme object distance EOD. A distance from the stereographic camera 110 to the closest foreground object may be defined as the minimum object distance MOD.

When the images from a stereographic camera, such as the stereographic camera 110, are displayed on a viewing screen, scene objects at the convergence distance will appear to be in the plane of the viewing screen. Scene objects, such as the primary subject 122 in the example of FIG. 1, located closer to the stereographic camera may appear to be in front of the viewing screen. Scene objects, such as the tree 116, located further from the stereographic camera may appear to be behind the viewing screen.

Each lens 114L, 114R may have adjustable focus. The lenses 114L, 114R may be focused at a common adjustable focus distance FD. The focus distance FD may be adjusted manually or may be automatically adjusted. The focus distance FD may be adjusted such that the cameras 112L, 112R are focused on the primary subject 122. The focus distance may be automatically adjusted in response to a sensor (not shown) that determines the distance from the cameras 112L, 112R to the primary subject 122. The sensor to determine the distance from the cameras to the primary subject 122 may be an acoustic range finder, an optical or laser range finder, or some other distance measuring device. In the case where the cameras 112L, 112R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 112L, 112R to the primary subject 122. However, as shown in FIG. 1, the convergence distance CD and the focus distance FD may not be the same distance. For example, the focus distance FD may be set at the distance from the cameras to the primary subject 122 and the convergence distance CD may be set slightly longer than the focus distance. In this case, when the images are displayed, the primary subject 122 will be seen to be in front of the plane of the viewing screen.

Each lens 114L, 114R may also have zoom capability, which is to say that the focal length FL of each lens may be adjusted. The focal lengths of the lenses 114L, 114R may be adjusted manually or automatically. The focal lengths of the lenses 114L, 114R may be adjusted synchronously such that focal lengths of the lenses are precisely the same at all times. The focal lengths of the lenses 114L, 114R may be adjustable over a predetermined continuous range of focal lengths.

The human eye is essentially a camera having a lens and an image sensor in the form of the retina of the eye. The lens projects an image of an outside scene onto the retina, which converts the image into electrical impulses for analysis by the brain. Since a person's eyes are separated by an interocular distance, the images formed on the two retinas are slightly different. The differences, commonly referred to as binocular disparity, between the two images are an important factor in depth perception. Other factors contributing to depth perception include a convergence angle between the lines of sight of the two eyes, the focus distance of the lenses, parallax, and shape cues present in the scene.

Figure 2:
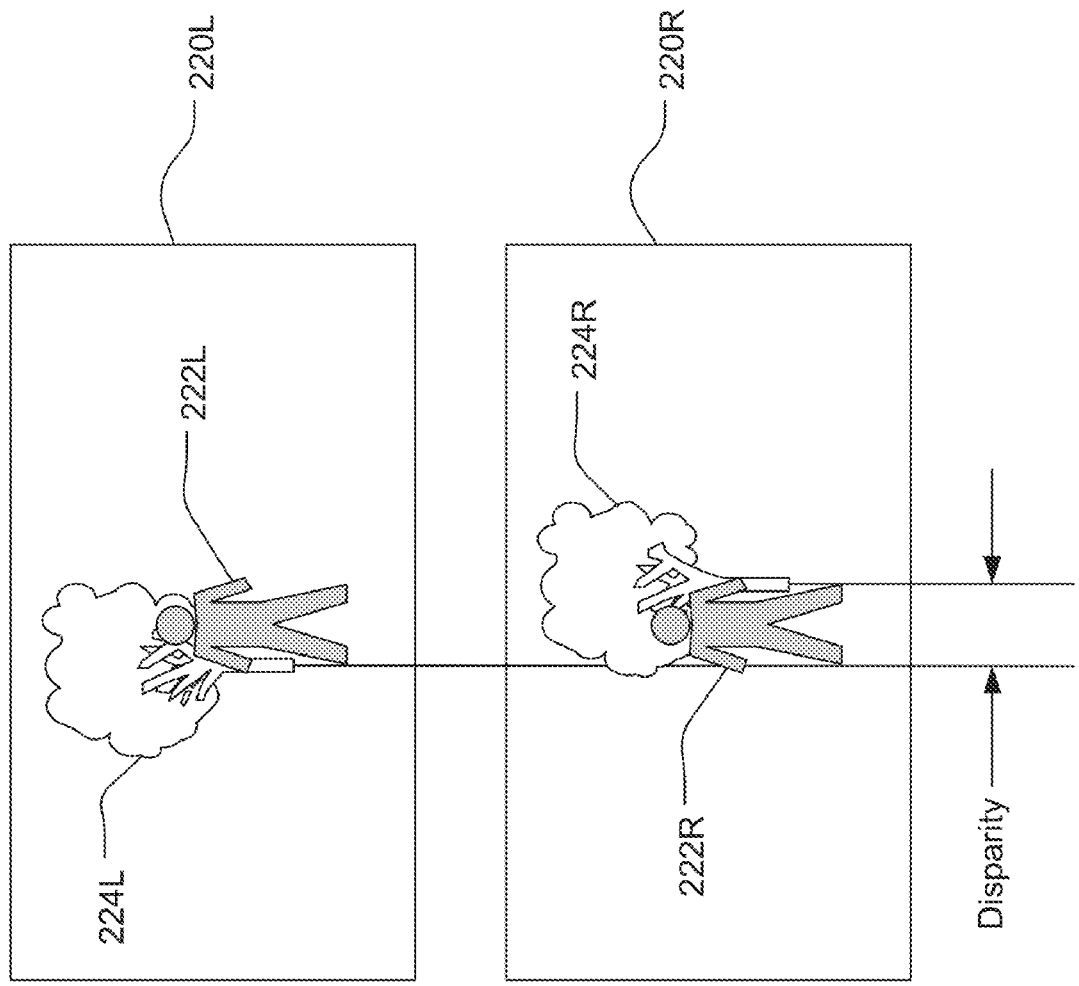
FIG. 2 is a representation of images captured by a stereographic camera.

As shown in FIG. 2, a stereographic display mimics natural depth perception by presenting different images to the left and right eyes. An exemplary image captured by a left camera is illustrated as displayed on a screen 220L and an exemplary image captured by a right camera is illustrated as displayed on a second screen 220R. The image displayed on the screen 220L includes an image 222L of a primary subject near the center of the display screen, and an image 224L of an extreme background object to the left of the image 222L. The image displayed on screen 220R includes an image 222R of the primary subject near the center of the display screen, and an image 224R of the extreme background object to the right of the image 222R.

In this patent, the positional difference between corresponding objects in the left and right display images will be referred to as "disparity". In the example of FIG. 2, the largest disparity occurs between the images 224L, 224R of the extreme background object. The disparity between corresponding objects in the left image 220L and the right image 220R may provide an illusion of depth when the two images are viewed separately by the left and right eyes of an observer. However, both the images 220L and 220R are located at the plane of the display screen and are invariant with respect to the viewer's head position. Thus a viewer receives somewhat conflicting information from a stereographic image—the binocular disparity present in the images indicates depth, but the constant focus distance and lack of parallax indicate a lack of depth. Viewers may not be able to properly fuse objects displayed with disparity greater than a limit value, which may be both viewer-dependent and image-dependent. Viewers may perceive scene objects displayed with disparity greater than the limit value as two separate items in the plane of the viewing screen, which may be disconcerting and disruptive to perceiving the rest of the stereographic image. Alternatively viewers may have to consciously intervene in the perception process (for example, by forcing their eyes to cross) to fuse scene objects displayed with disparity greater than the limit value.

To preserve a comfortable illusion of depth, a stereographic image may be captured or generated in a manner that constrains disparity to less than a predetermined maximum disparity. For example, the disparity within a stereographic image may be controlled by adjusting an interocular distance of the stereographic camera used to capture the image. The interocular distance may be controlled automatically as a scene or event is captured, as described in copending patent application Ser. No. 12/578,488, entitled Stereo Camera With Automatic Control of Interocular Distance. The interocular distance may be controlled by an operator in real time, or may be predetermined and fixed, during the capture of a scene or event.

Figure 3:
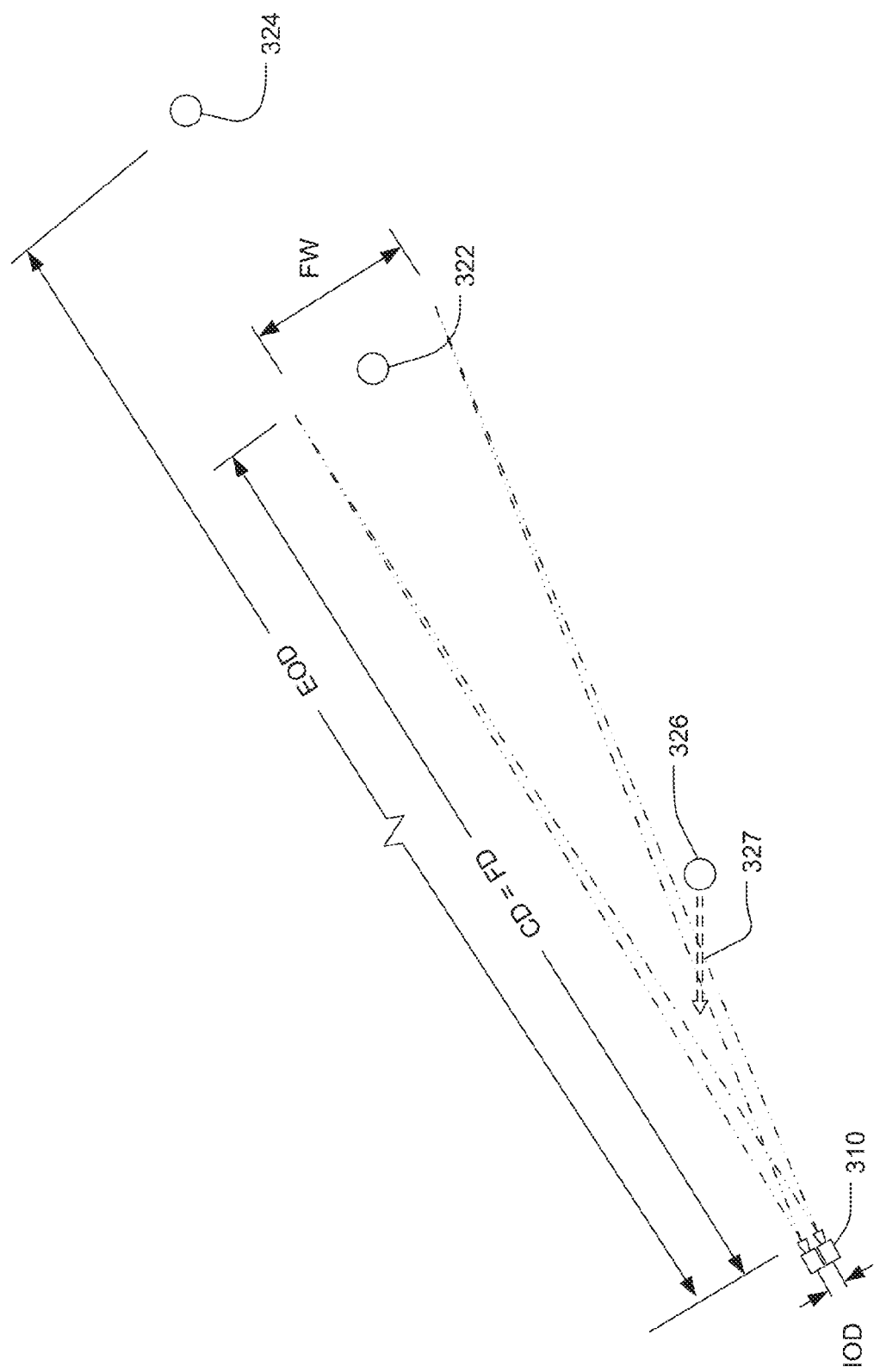
FIG. 3 is a schematic view of a stereographic camera in an environment.

Referring now to FIG. 3, a stereographic camera 310, which may be the stereographic camera 110, may be used to capture live events such as sporting events. The stereographic camera 310 may be, for example, capturing a scene including a primary object 322 such as an athlete. The primary object 322 may be disposed in front of at least one background object 324 such as, for example, other athletes or spectators located on the far side of the playing field or venue where the sporting event is held.

A focus distance FD of lenses within the stereographic camera 310 may be controlled such that the focus distance is equal to the physical distance from the stereographic camera 310 to the primary subject 322. A focal length of the lenses within the stereographic camera may be set to define an image frame inclusive of the primary object 322. In the top view of FIG. 3, a width of the image frame is indicated by dimension FW. A convergence angle of the stereographic camera 310 may also be controlled such that a convergence distance CD of the stereographic camera 310 is, in this example, equal to the focus distance. An extreme object distance EOD from the stereographic camera 310 may be measured or estimated, for example from the known physical dimensions of the venue or playing field.

An interocular distance IOD of the stereographic camera 310 may be set to provide a pleasing stereographic effect without introducing objectionably large disparity between the left and right images captured by the stereographic camera. The IOD may be predetermined and fixed. The IOD may be set in near-real time by an operator, such as a video engineer, observing the images from the stereographic camera 310. The IOD may be automatically determined from the operating parameters of the stereographic camera and the scene characteristics as described in copending patent application Ser. No. 12/578,488, entitled Stereo Camera With Automatic Control of Interocular Distance, the entire disclosure of which is incorporated herein by reference.

When a stereographic camera is used to capture a live event, such as a sporting event, a foreground object 326 may move relative to the stereographic camera 310 such that the foreground object may spontaneously intrude into field of view of the stereographic camera 310. The intruding object 326 may be for example, an athlete or other person who runs or walks into the field of view as indicated by the dashed arrow 327. The intruding object 326 may be, for further example, a stationary person or other object that enters the field of view as an operator of the stereographic camera 310 pans or rotates the camera to track movements of the primary object 322. The intruding object 326 may enter the field of view of the stereographic camera at a position much closer than the primary object 322. When the intruding object 326 is close to the stereographic camera, the intruding object may appear in the captured stereographic image with very large disparity. In this situation, the intrusion of the object 326 may be disconcerting and disruptive to viewers of the captured stereographic image.

Figure 4:
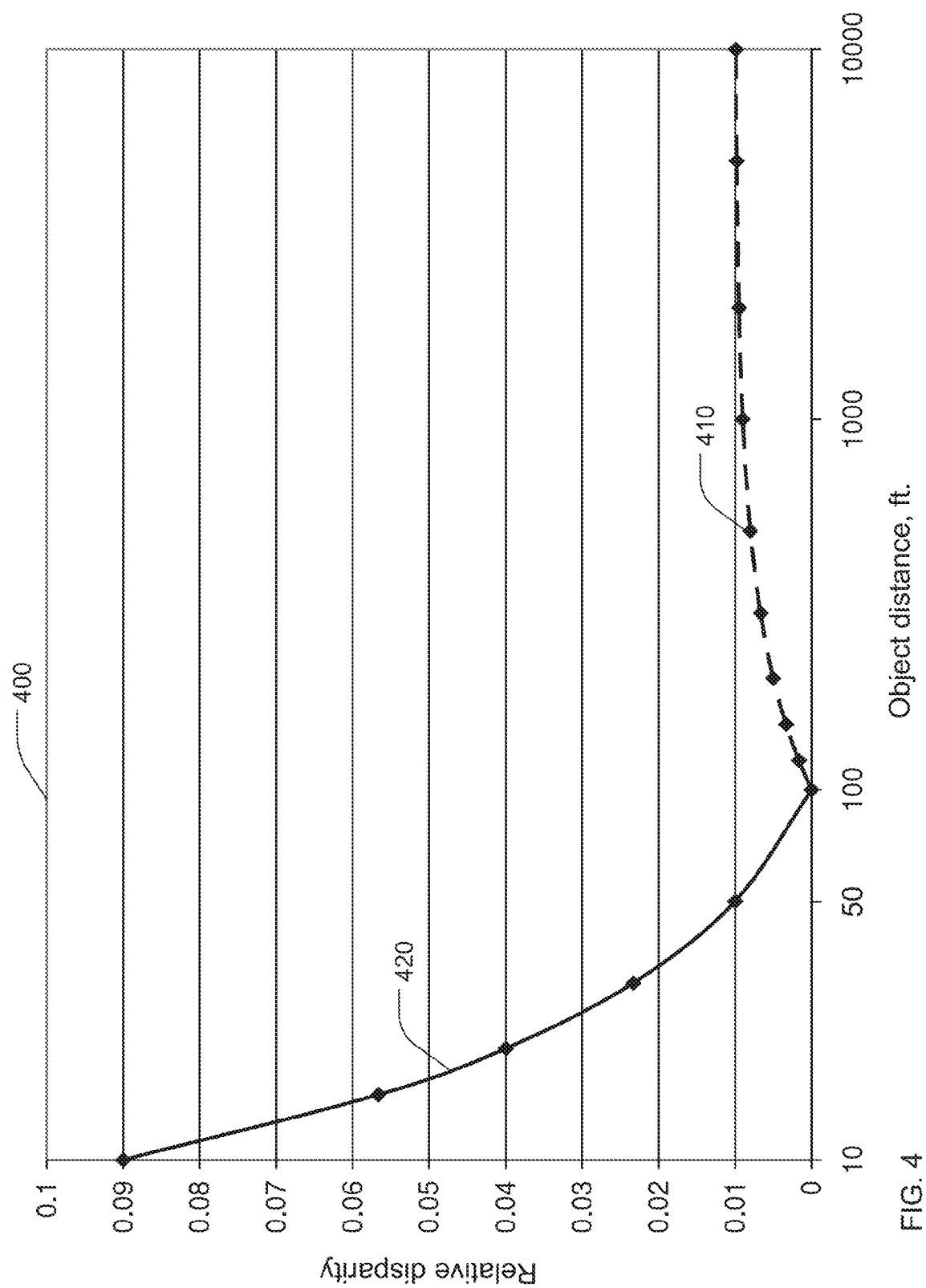
FIG. 4 is a chart showing relative disparity as a function of object distance for an exemplary stereographic camera.

FIG. 4 shows a graph 400 of the relative disparity, or disparity expressed as a portion of the stereoscopic image width, caused by scene objects at various distances from a stereographic camera. The data graphed in FIG. 4 was calculated with the assumption that the stereographic camera is focussed and converged upon a primary scene object 100 feet from the camera. Thus the disparity caused by an object 100 feet from the camera is zero. The data graphed in FIG. 4 is based on the additional assumptions that the lens focal length is set such that the captured image frame width is 10 feet (at the primary object distance of 100 feet), and that the interocular distance of the stereographic camera is set such that the disparity of a background object at infinite distance from the camera is 0.01, or 1% of the image width.

The dashed line 410 is a plot of the disparity of background objects captured by a stereographic camera having the assumed operating parameters. The relative disparity is zero for objects 100 feet from the camera and gradually increases to 0.01 as the object distance increases. The solid line 420 is a plot of the disparity of foreground objects captured by the assumed stereographic camera. The disparity is zero for foreground objects 100 feet from the camera and increases exponentially as the distance between the camera and the foreground object decreases. The relative disparity of an object 50 feet from the camera is 0.01 (the same as an object at infinite distance) and the relative disparity of an object 10 feet from the camera is 0.09. Thus an intrusion of a foreground object close to a stereographic camera may result in very high and displeasing disparity in portions of a captured stereographic image.

Figure 5:
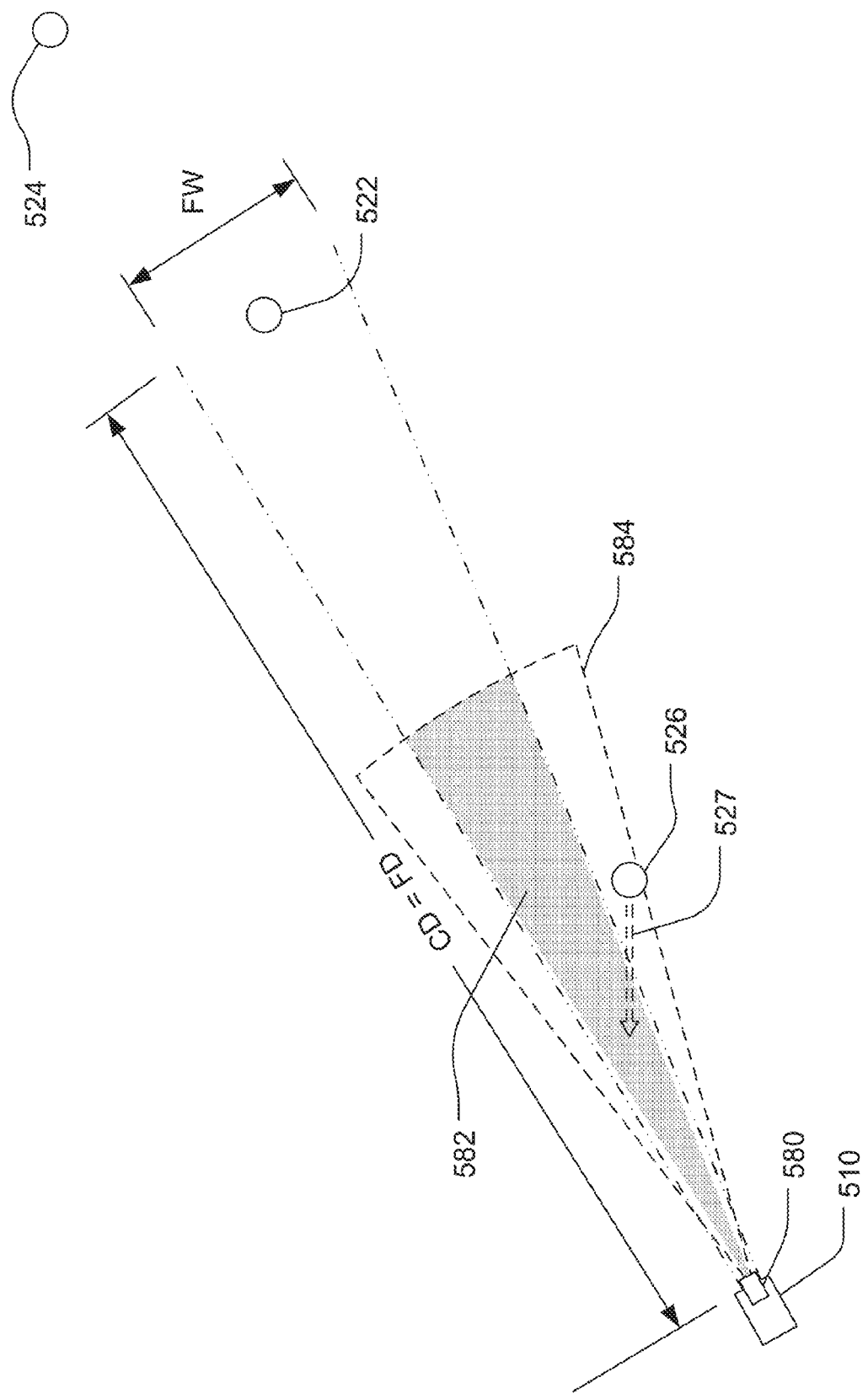
FIG. 5 a schematic view of a stereographic camera with foreground object distance sensing in an environment.

Referring now to FIG. 5, a stereographic camera 510 may be used to capture a scene including a primary object 522 such as an athlete. The primary object 522 may be disposed in front of at least one background object 524 such as, for example, other athletes or spectators located on the far side of the playing field or venue where the sporting event is held. A foreground object 526 may move with respect to the stereographic camera 510, as indicated by the dashed arrow 527, and may spontaneously intrude into the field of view of the stereographic camera 510.

The stereographic camera 510 may include or be coupled to a distance sensor 580 to sense the distance from the stereographic camera to foreground objects such as the object 526. The distance sensor 580 may be an active sensor that transmits some type of energy, receives a portion of the energy reflected from one or more objects, and determines the distance to the object from a difference between the transmitted and received energy. For example, the distance sensor 580 may be a time-of-flight sensor that emits pulses of optical, acoustic, ultrasonic, or radio frequency (RF) energy and determines the distance to objects from the elapsed time required for the emitted energy pulses to reflect from the objects and return to the sensor 580. For further example, the distance sensor may transmit a frequency modulated continuous wave signal (FMCW) and determine the distance to an object by the instantaneous frequency difference between the transmitted signal and a received signal reflected from the object. The distance sensor 580 may be some other type of distance sensor configured to provide data indicative of a distance from the stereographic camera 510 to a closest foreground object.

The distance sensor 580 may be adapted to sense distances to objects within an angular field of regard. Although the distance sensor 580 may sense distances to multiple objects within an angular field of regard, the distance to only the closest near field object may be used to adjust the operating parameters of the stereographic camera 510 to control the maximum disparity present in the captured stereographic image.

As indicated by the shaded wedge 582, the field of regard of the distance sensor 580 may be about the same as the frame width FW of the stereographic camera 510. In this case, the distance sensor 580 may sense a distance to a closest foreground object within the image frame of the stereographic camera 510. As indicated by the dashed wedge 584, the field of regard of the distance sensor 580 may be larger than the frame width FW of the stereographic camera 510. In this case, the distance sensor 580 may sense a distance to the closest foreground object within or proximate to the image frame of the stereographic camera 510. Sensing the distance to objects proximate to the image frame may allow the operating parameters of the stereographic camera to be adjusted before a close foreground object enters the image frame. Adjusting the operating parameters of the stereographic camera before a foreground object enters the image frame may avoid transient images having large disparity.

Figure 6:
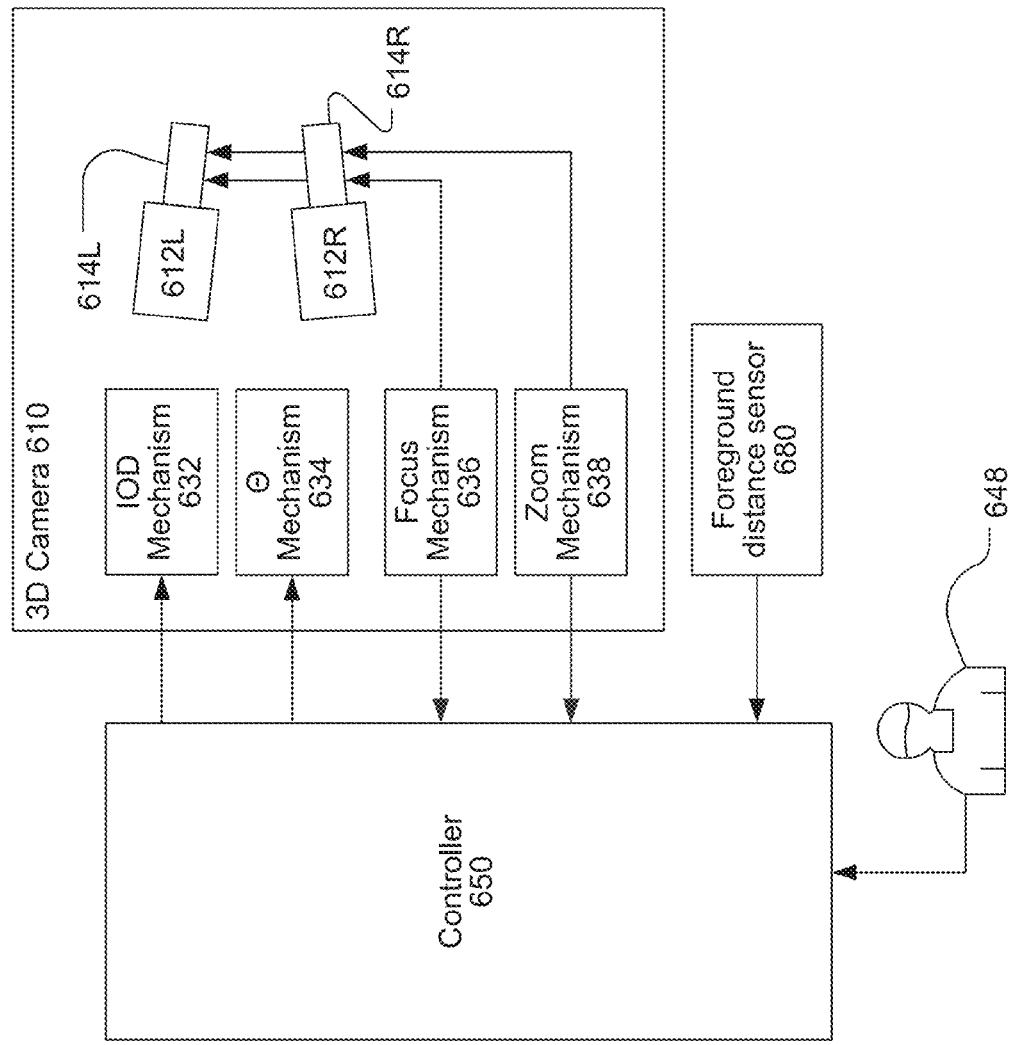
FIG. 6 is a block diagram of a stereographic camera with foreground object distance sensing.

Referring now to FIG. 6, a stereographic camera system 600, may include a stereographic camera 610 and a foreground object distance sensor 680 coupled to a controller 650. The foreground object distance sensor 680 may be included within the stereographic camera 610 or may be mounted on or coupled to the stereographic camera 610. The foreground object distance sensor 680 may sense a distance to a closest foreground object within or near the field of view of the stereographic camera 610.

The stereographic camera 610 may include a plurality of mechanisms to adjust the position and/or orientation of the left and right cameras 612L, 612R. The stereographic camera 610 may also include a focus mechanism 636 and a zoom mechanism 638 to synchronously adjust a focus distance and a focal length, respectively, of the left and right lenses 614L, 614R.

The stereographic camera 610 may include an IOD mechanism 632 to adjust an interocular distance between the left camera 612L and the right camera 612R. The stereographic camera 610 may include a Θ mechanism 634 to adjust a stereo convergence angle between the left camera 612L and the right camera 612R by pivoting one or both cameras about respective pivot axes. The IOD mechanism 632, and the Θ mechanism 634 may include one or more movable platforms or stages coupled to motors or other actuators. The IOD mechanism 632 and the Θ mechanism 634 may be adapted to set the interocular distance and the stereo convergence angle, respectively, in response to data received from the controller 650. Within this patent, the term "data" is intended to include digital data, commands, instructions, digital signals, analog signals, optical signals and any other data that may be used to communicate the value of a parameter such as interocular distance or convergence angle.

The focus mechanism 636 may synchronously adjust and set the focus distance of the lenses 614L, 614R. The focus mechanism 636 may include a mechanical, electronic, electrical, or electro-mechanical linkage between the lenses 614L, 614R to simultaneously adjust the focus distance of both lenses to the same value. The focus mechanism 636 may be manually actuated by a camera operator or assistant camera operator (commonly called a "focus puller") to set the focus distance The focus mechanism 636 may include a sensor to send data indicative of the focus distance to the controller 650.

The zoom mechanism 638 may synchronously adjust and set the focal length of the lenses 614L, 614R. The zoom mechanism 638 may include a mechanical, electronic, electrical, or electro-mechanical linkage between the lenses 614L, 614R to simultaneously adjust the focal length of both lenses to the same value. The zoom mechanism 638 may be manually actuated by a camera operator to set the lens focal length. The zoom mechanism 638 may include a sensor to send data indicative of the focal length to the controller 650.

The controller 650 may also receive data from an operator 648, who may be for example a video engineer, indicating operating parameters for the stereographic camera 610. For example, the controller 650 may receive data from the operator 648 indicating a focus distance to convergence distance offset. The controller 650 may also receive data from the operator 648 indicating a desired interocular distance between the cameras 612L, 612R. Alternatively, the controller may automatically calculate a desired interocular distance based on the focus distance and focal length of the lenses 614L, 614R and scene characteristics. For example, the controller 650 may automatically calculate the desired interocular distance as described in copending patent application Ser. No. 12/578,488, entitled Stereo Camera With Automatic Control of Interocular Distance. In either case, the controller 650 may determine the required interocular distance IOD and convergence angle Θ and send data indicating the interocular distance and convergence angle to the stereographic camera 610.

The controller 650 may receive data from the foreground distance sensor 680 indicating the distance to the nearest foreground object within or proximate the image frame of the stereographic camera 610. The controller 650 may determine a maximum allowable interocular distance based on the data received from the foreground distance sensor 680. The controller may determine the maximum allowable interocular distance to limit the disparity caused by the closest foreground object to a predetermined maximum disparity value. When the maximum allowable interocular distance is less than an interocular distance set by the operator 648, the controller may automatically override the operator 648 and cause the interocular distance of the stereographic camera 610 to be set to the maximum allowable interocular distance.

In situations where the closest foreground object is very close to the stereographic camera 610, the controller 650 may cause the stereographic camera to revert to a non-stereographic, or 2D, mode in which the video signal from only one of the cameras 612L, 612R is captured and sent to both of viewer's eyes. Alternatively, a 2D mode may be realized by reducing the interocular distance of the stereographic camera 610 to zero.

Figure 7:
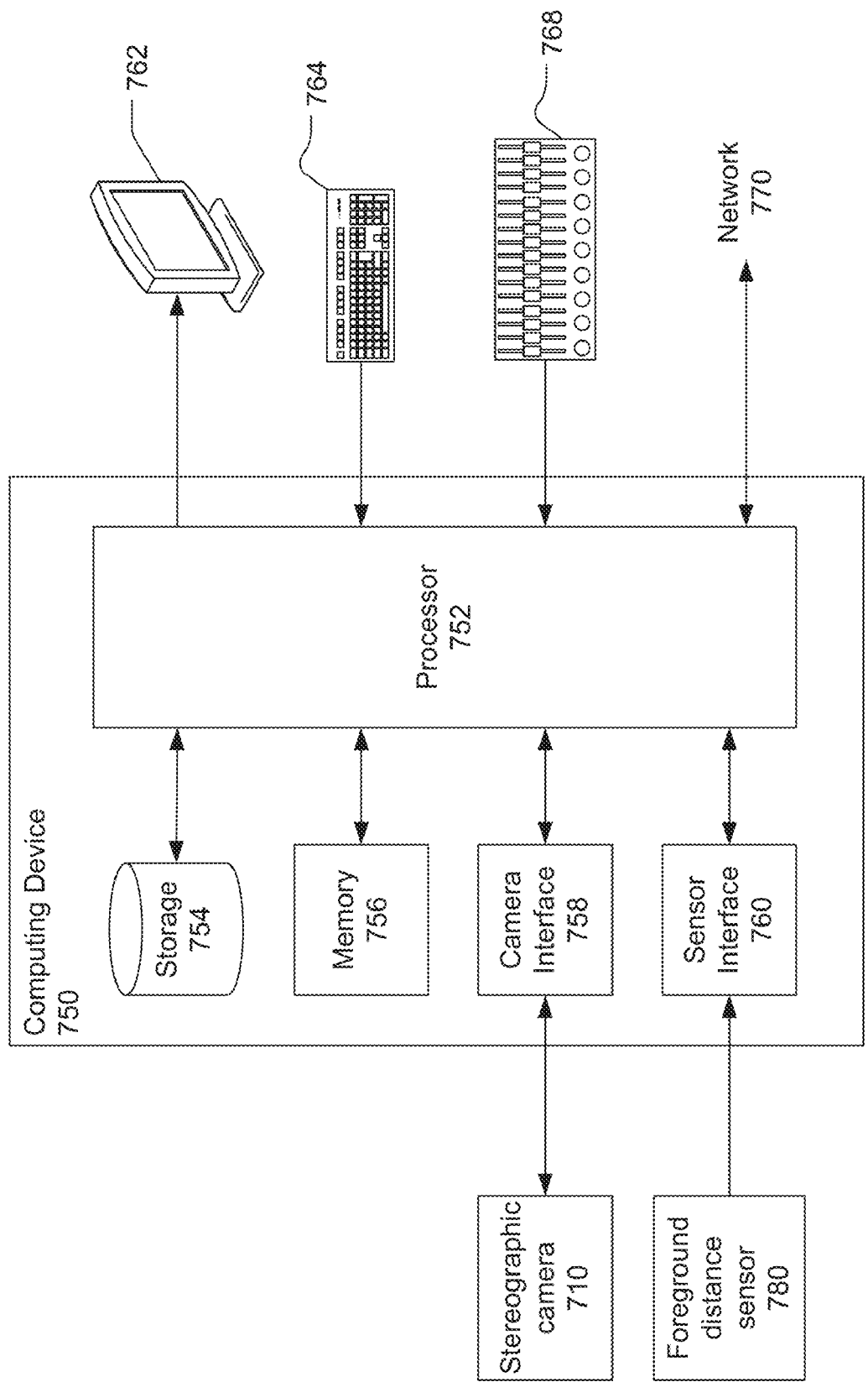
FIG. 7 is a block diagram of a computing device.

FIG. 7 is a block diagram of a computing device 750 that may be suitable for the controller 650. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 750 may include hardware, firmware, and/or software adapted to perform the processes subsequently described herein. The computing device 750 may include a processor 752 coupled to a memory 756 and a storage device 754.

The storage device 754 may store instructions which, when executed by the processor 752, cause the computing device to provide the features and functionality of the controller 650. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 750 may include or interface with a display device 762 and one or more input devices such a keyboard 764. The computing device 750 may include or interface with a camera operator interface 768, by which a camera operator may control, at least in part, the operation of one or more cameras. For example, the camera operator interface may be adapted to allow a camera operator or video engineer to enter 3D camera operating parameters including some or all of a focus distance to convergence distance offset, a maximum allowable disparity, and/or an interocular distance.

The computing device 750 may also include an interface with one or more networks 770. The computing device 750 may interface with the network 770 via a wired or wireless connection. The network 770 may be the Internet or any other private or public network.

The computing device 750 may also include a camera interface unit 758 to interface with a stereographic camera 710. The camera interface unit 758 may include a combination of circuits, firmware, and software to interface with the stereographic camera 710. The camera interface unit 758 may be coupled to the stereographic camera 710 via a network which may be a local area network; via one or more buses such as a USB bus, a PCI bus, a PCI Express bus, or other parallel or serial data bus; or via one or more direct wired or wireless connections. The camera interface unit 758 may be coupled to the stereographic camera 710 via a combination of one or more of direct connections, network connections, and bus connections.

The computing device 750 may also include a sensor interface unit 760 to interface with a foreground object distance sensor 780. The sensor interface unit 760 may include a combination of circuits, firmware, and software to interface with the foreground object distance sensor 780. The computing device 750 may receive data indicative of a distance to a closest foreground object from the distance sensor 780. The computing device 750 may process data received from the foreground object distance sensor 780 to extract the distance to the closest foreground object. The sensor interface unit 760 may be coupled to the foreground object distance sensor 780 via a network which may be a local area network; via one or more buses such as a USB bus, a PCI bus, a PCI Express bus, or other parallel or serial data bus; or via one or more direct wired or wireless connections.

The processes, functionality and features of the computing device 750 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 750 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 752 and others by other devices.

Description of Processes

Figure 8:
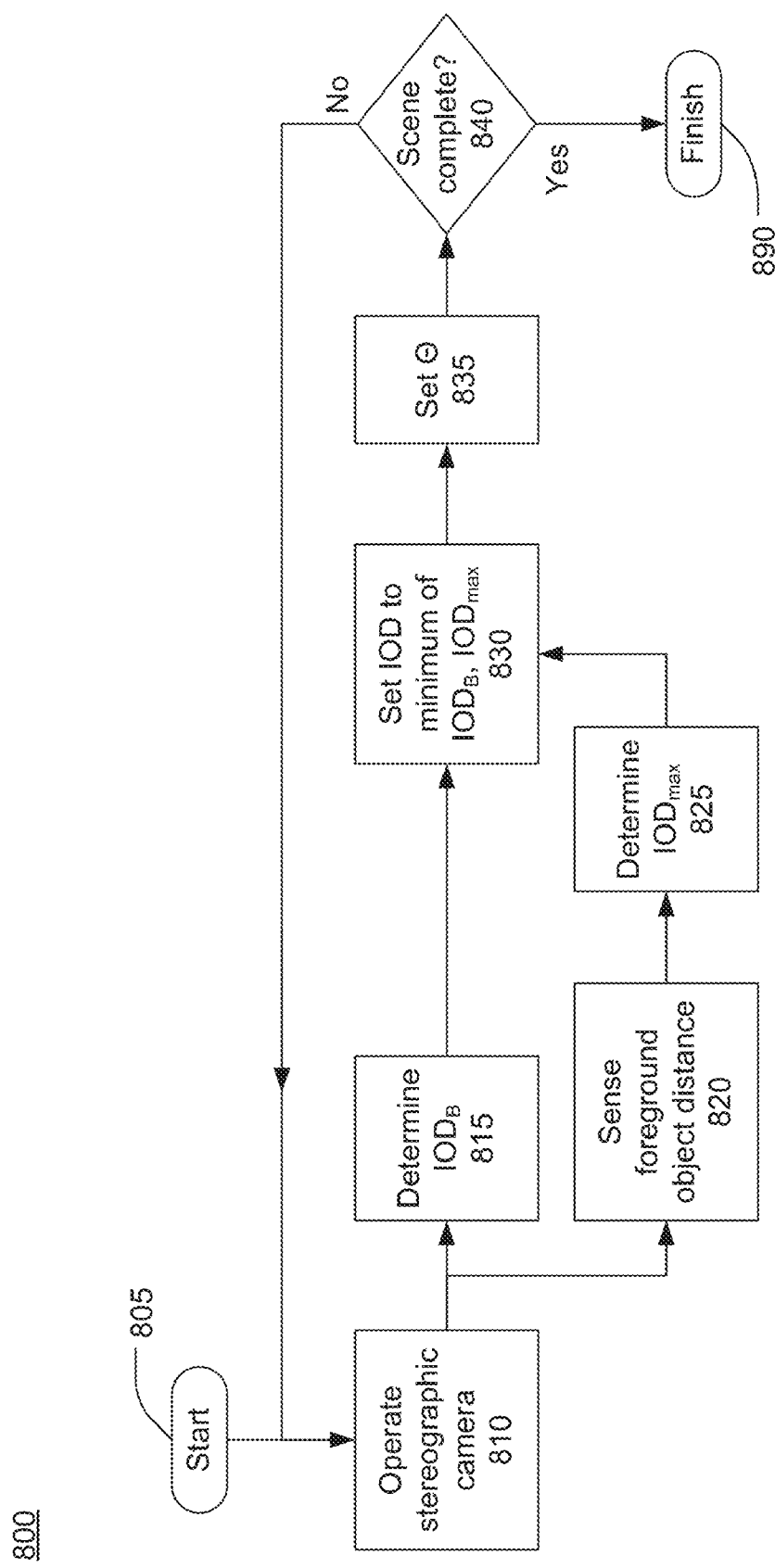
FIG. 8 is a flow chart of a process for operating a stereographic camera with foreground object distance sensing.

FIG. 8 is a flow chart of an exemplary process 800 for capturing stereoscopic images using a stereoscopic camera system with foreground object distance sensing such as the camera system 600. The flow chart of FIG. 8 has a start 805 and a finish at 890 when the recording of one or more scenes is complete. The process 800 is cyclic in nature, and the actions 810-835 may be repeated for each of a large plurality of scenes that may constitute, for example, a motion picture or television program. The process 800 is continuous in nature and the actions 810-835 within the process may be performed continuously and in near-real time during the recording of each scene. Within this patent, the phrase "near-real time" means in real time except for processing delays that are very short compared with temporal events in the scene being recorded.

At 810, a stereographic camera may be operated to capture a stereographic image of a scene or event. Operating the stereographic camera may include, for example, setting pan and tilt angles such that the stereographic camera is pointed toward a primary object to be captures, setting a lens focus distance such that left and right lenses of the stereographic camera are focused upon or near the primary object, and setting a focal length of the lenses to define a pleasing image frame around the primary object. The stereographic camera may be operated by one or more operators. For example, when capturing live events such as sporting events, the stereographic camera may be operated by a single cameraman. When recording a cinematic production, a head cameraman may control the pan and tilt angles and the lens focal length, and a focus puller may control the lens focus distance. In either case, the cameraman or another operator, such as a recording engineer, may control other parameters of the stereographic camera such as interocular distance and focus distance to convergence distance offset.

The stereographic camera may include an automatic focus subsystem that set the focus distance of the lenses. An automatic focus subsystem may set the lens focus distance based on a sensor that measures the distance to a specific object with an image frame (typically the object in the center of the image). An automatic focus subsystem may set the lens focus distance by varying or dithering the lens focus distance while analyzing a selected portion of the image frame captured by the stereographic camera. The selected portion of the image frame may be set by an operator or may be determined automatically (for example by recognizing faces within the image frame)

At 815, a baseline interocular distance $IOD_B$ for the stereographic camera may be determined. $IOD_B$ may be predetermined and fixed for a given scene or event. $IOD_B$ may be set in real time while recording a scene or event by an engineer or camera operator. $IOD_B$ may be automatically determined and set based on the operating parameters of the stereographic camera and known characteristics of the scene including a distance to a furthest background object. For example, $IOD_B$ may be determined and set as described in copending patent application Ser. No. 12/578,488.

At 820, a distance to a closest foreground object may be sensed using a foreground object distance sensor within or coupled to the stereographic camera. The foreground object distance sensor may be independent of an autofocus distance sensor if present in the stereographic camera. An autofocus distance sensor may measure the distance to an object within a specific portion of the image frame, while the foreground object distance sensor may measure the distance to the closest object within a field of regard equal to or larger than the image frame.

At 825, a maximum allowable interocular distance $IOD_{max}$ may be determined based, in part, on the distance to the closest foreground object from 820 and operating parameters of the stereographic camera set at 810. For example, $IOD_{max}$ may be determined in accordance with the formula:

$$IOD_{MAX} = (FOD \times CD \times MD \times W)/[(CD-FOD) \times FL] \quad (3)$$

wherein $IOD_{MAX}$=the maximum interocular distance;
W=a width of an image sensor within each camera;
FL=a focal length of the lenses;
FOD=the distance to the closest foreground object as indicated by the output of the foreground distance sensor;
MD=a predetermined maximum disparity as a fraction of the width of the scene recorded by the stereographic camera; and CD=a convergence distance of the stereographic camera.

At 830, the interocular distance IOD of the stereographic camera may be set equal to or less than $IOD_{max}$ as determined at 825. IOD may be set to the smaller of $IOD_B$ from 815 and $IOD_{max}$ from 825.

At 835, a convergence angle Θ may be determined and set based on the IOD set at 830 and a convergence distance set at 810. For example, Θ may be determined and set in accordance with formula (I).

At 840, a determination may be made if the recording of the scene or event has been completed. When the scene or event has not been completed, the process 800 may repeat from 810. The actions from 810 to 840 may be performed continuously and essentially simultaneously until the scene or event is completed. When the scene or event has been completed, the process may finish at 890.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

Within this description, the terms "unit" and "engine" mean a collection of hardware which may be augmented by firmware, and/or software. A "unit" may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A stereoscopic camera system, comprising:
    a left camera and a right camera including respective left and right lenses
    a manually-actuated zoom mechanism to set a focal length of the left and right lenses
    a focus mechanism to set a focus distance of the left and right lens
    an IOD mechanism to set an interocular distance between the left and right cameras
    a foreground object distance sensor to sense, in near-real time, a distance to a closest foreground object
    a controller coupled to the focus mechanism, the zoom mechanism, the foreground object distance sensor, and the IOD mechanism, the controller configured to
        cause the IOD mechanism to set the interocular distance to a smaller one of a baseline interocular distance that is predetermined and fixed for the duration of a scene, and a maximum interocular distance automatically determined based on, in part, the focal length, the focus distance and the distance to the closest foreground object.

2. The stereoscopic camera system of claim 1, further comprising:
    a convergence angle mechanism to set a convergence angle between the left and right cameras
    wherein the controller causes the convergence angle mechanism to set the convergence angle based on the interocular distance and the focus distance.

3. The stereoscopic camera system of claim 1, wherein
    the foreground distance sensor is configured to sense distances to objects within a field of view of the stereoscopic camera and objects proximate to the field of view of the stereoscopic camera.

4. The stereoscopic camera system of claim 1, wherein
    the focus mechanism is manually actuated.

5. The stereoscopic camera system of claim 1, wherein
    the focus mechanism is an automatic focus subsystem that sets the focus distance independent of the foreground object distance sensor.

6. The stereoscopic camera system of claim 5, wherein
    the automatic focus subsystem is configured to determine a distance to a specific object within a field of view of the stereoscopic camera
    the foreground object distance sensor is configured to measure the distance to the closest object within a field of regard equal to or larger than the field of view of the stereoscopic camera.

7. A method of operating a stereoscopic camera system including left and right cameras with respective left and right lenses, the method comprising:
    manually actuating a zoom mechanism to set a focal length of the left and right lenses
    setting a focus distance of the left and right lenses
    sensing, in near-real time, a distance to a closest foreground object with a foreground object distance sensor
    automatically setting an interocular distance between left and right cameras to a smaller one of a baseline interocular distance that is predetermined and fixed for the duration of a scene, or a maximum interocular distance determined based on, in part, the focal length, the focus distance, and the sensed distance to the closest foreground object.

8. The method of claim 7, further comprising:
    a convergence angle mechanism to set a convergence angle between the left and right cameras
    setting a convergence angle between the left and right cameras based on the interocular distance and the focus distance.

9. The method of claim 7, wherein
    the foreground distance sensor is configured to sense distances to objects within a field of view of the stereoscopic camera and objects proximate to the field of view of the stereoscopic camera.

10. The method of claim 7, wherein setting the focus distance of the left and right lenses comprises:

manually actuating a focus mechanism to set the focus distance of the left and right lenses.

11. The method of claim 7, wherein setting the focus distance of the left and right lenses is performed by an automatic focus subsystem that sets the focus distance independent of the foreground object distance sensor.

12. The method of claim 11, wherein
the automatic focus subsystem is configured to determine a distance to a specific object within a field of view of the stereoscopic camera
the foreground object distance sensor is configured to measure the distance to the closest object within a field of regard equal to or larger than the field of view of the stereoscopic camera.

* * * * *